United States Patent [19]
Dvorak et al.

[11] Patent Number: 5,934,406
[45] Date of Patent: Aug. 10, 1999

[54] JERK CONTROL VALVE FOR PILOT OPERATED STEERING SYSTEM

[75] Inventors: Paul A. Dvorak, Kewanee; Steven R. Wells, Aurora, both of Ill.

[73] Assignee: Caterpillar Inc., Peoria, Ill.

[21] Appl. No.: 08/865,570

[22] Filed: May 29, 1997

[51] Int. Cl.⁶ ..................................................... B62D 5/00
[52] U.S. Cl. ........................................... 180/442; 180/403
[58] Field of Search ..................................... 180/417, 402, 180/403, 442; 91/461

[56] References Cited

U.S. PATENT DOCUMENTS

| | | | |
|---|---|---|---|
| 4,914,913 | 4/1990 | St. Germain et al. | 60/384 |
| 5,215,158 | 6/1993 | Pederson | 180/32 |
| 5,320,191 | 6/1994 | Sudo et al. | 180/132 |
| 5,701,970 | 12/1997 | Arbjerg | 180/417 |
| 5,845,737 | 12/1998 | Suzuki et al. | 180/441 |

*Primary Examiner*—Lanna Mai
*Assistant Examiner*—Jason S. Brooks
*Attorney, Agent, or Firm*—David M. Masterson; John W. Grant

[57] ABSTRACT

A jerk control valve adapted for use in a pilot operated steering system has a pilot operated valve biased to an open position by a spring for communicating left steer and right steer pilot lines to a tank through a pair of orifices. The pilot operated valve is moveable to a closed position blocking communication through the first and second orifices when the highest pressure of the left and right steer pilot lines exceeds a predetermined value. The left and right steer pilot lines are continuously communicated with the tank through a pair of orifice devices.

3 Claims, 1 Drawing Sheet

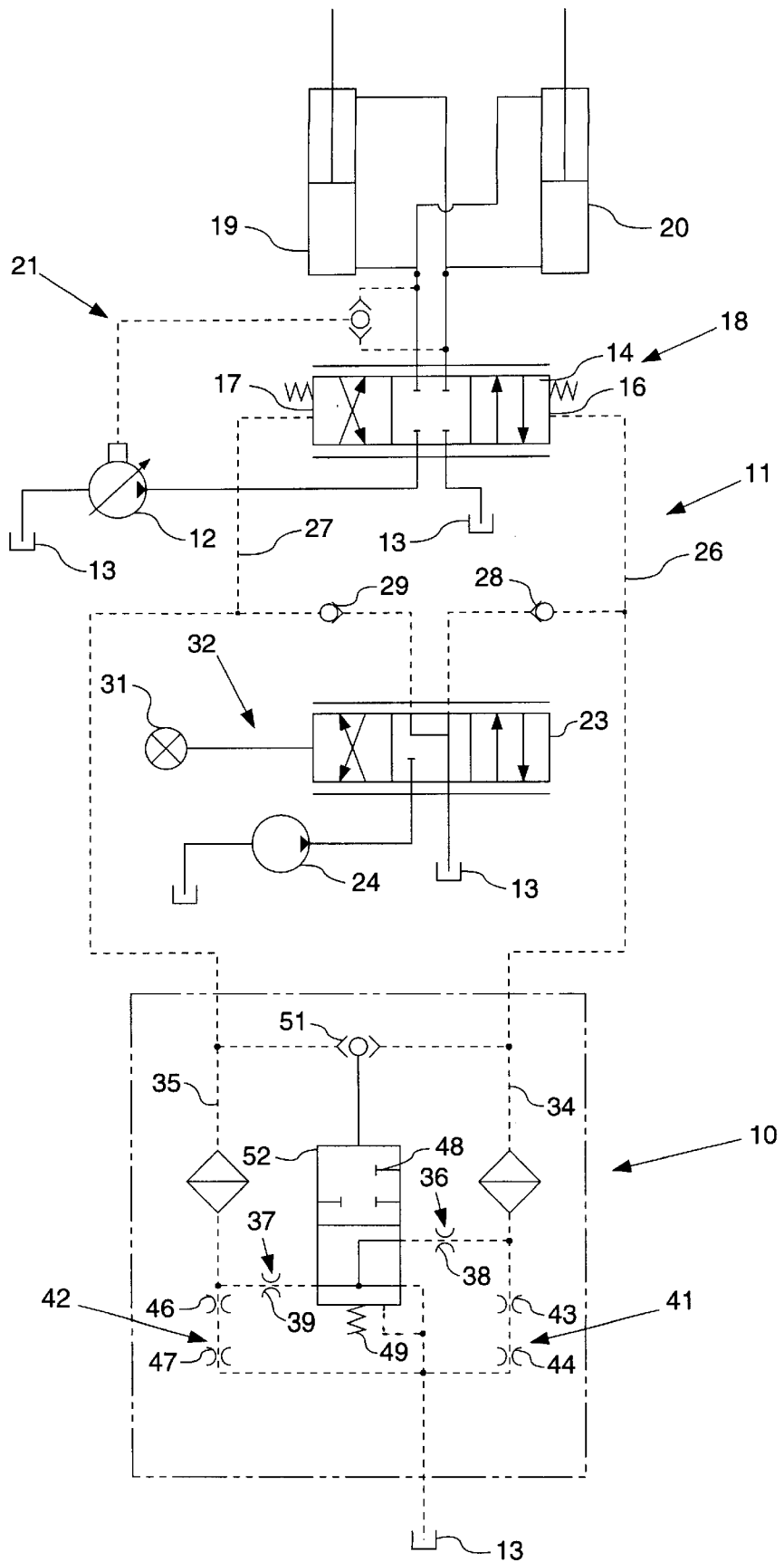

JERK CONTROL VALVE FOR PILOT OPERATED STEERING SYSTEM

TECHNICAL FIELD

This invention relates generally to a pilot operated steering system and more particularly to a steering system incorporating a jerk control valve for providing independent control of start steer jerk and stop steer jerk.

BACKGROUND ART

A typical pilot operated jerk steer system for a mobile machine includes a pilot operated steering valve for controlling flow of fluid from a steering pump to the steering cylinders and from the steering cylinders to a tank. The position of the steering control stem of the steering valve is controlled by a pilot valve which sends pressurized oil to one end of the control stem for shifting the control stem. Steering is typically controlled by manual manipulation of a steering wheel connected to the pilot valve through suitable mechanical linkage or in some instances, by manual manipulation of a steering lever mechanically connected to the pilot valve.

Steering to the right, for example, is initiated by rotating the steering wheel rightward so that the pilot valve sends pressurized pilot oil through a right steer pilot line to the right steer end of the control stem. However, the left steer end of the control stem has to be vented to the tank in order for the control stem to move in the right steer direction. In the early steering systems, the left steer end was typically vented to tank through the pilot valve. This created a problem in that the oil was vented so quickly that the control stem traveled further than intended (overshoot) as it shifted in the right steer direction. The control stem overshoot caused more oil to flow from the pump to the steering cylinders than intended when a right turn was initiated resulting in jerky or unpredictable steering. The rate at which the vehicle accelerated when steering begins is often referred to as "start steer jerk". The same reaction occurs when a left steer operation is initiated.

In a jerk steer system, the right steer motion is stopped by returning the pilot valve to its neutral position to stop supplying pressurized pilot oil to the control stem and to connect both ends of the control stem to the tank through the pilot valve. The centering spring quickly returns the control stem to its neutral position to block pump-to-cylinder and cylinder-to-tank flow. This created another problem in that quickly returning the control stem to its neutral position caused rapid deceleration of the steering motion. The rate at which the steering decelerates when the operator stops the steering motion is often referred to as "stop steer jerk".

Both the start steer jerk and stop steer jerk can be alleviated somewhat by adding check valves in the pilot lines between the pilot valve and the ends of the control stem and adding a dampening orifice between the tank and each of the pilot lines. The check valves block the flow of oil from the ends of the control stem to the pilot valve thereby, forcing the oil exhausted from the ends of the control stem to pass through the dampening orifice. For example, the left steer dampening orifice controls the amount of overshoot and thus the start steer jerk when a right steer operation is initiated, the right steer dampening orifice controls the rate at which the steer valve returns to the neutral position from a right steer direction and thus controls the stop steer jerk, the right steer dampening orifice controls the amount of overshoot and thus the start steer jerk when a left steer operation is initiated and the left steer dampening orifice controls the rate at which the control stem returns to the neutral position from a left steer direction and thus the stop steer jerk.

One of the problems with the steering systems having the check valves in the pilot lines and the dampening orifices is that the start steer jerk levels and the stop steer jerk levels cannot be controlled independent from one another because they are both controlled by a fixed area dampening orifice on each side of the control stem. The orifice diameters must be equal to provide equal dampening for left and right steering. A very small orifice diameter on both orifices will provide a very low stop steer jerk which is desirable but will also reduce the start steer jerk levels and the start steer response to unacceptable low levels. Fast start steer response which results in some amount of start steer jerk is required to provided adequate control of the machine. However, a dampening orifice is still required to control the start steer jerk and start steer response so that the steering system is not over-responsive resulting in jerky, uncontrollable steering. A large dampening orifice diameter that provides acceptable start steer jerk and start steer response results in unacceptable high stop steer jerk levels because the large dampening orifice would allow the control stem to return to the neutral position too quickly causing a high rate of steering deceleration. The typical pilot operated jerk steering system must use a dampening orifice diameter that provides compromised performance of star steer jerk, start steer response and stop steer jerk since no one parameter can be set to optimum performance without sacrificing performance of the other parameter.

The present invention is direction to overcoming one or more of the problems as set forth above.

DISCLOSURE OF THE INVENTION

In one aspect of the present invention a jerk control valve is adapted for use in a pilot operated steering system having a tank right steer and left steer pilot lines and a check valve disposed in each of the pilot lines. The jerk control valve includes a right steer flow passage communicating the right steer pilot line with the tank, a left steer flow passage communicating the left steer pilot line with the tank, first orifice means disposed between the right steer flow passage and the tank, second orifice means disposed between the left steer flow passage and the tank, third orifice means disposed in the right steer flow passage, and fourth orifice means disposed in the left steer flow passage. A pilot operated valve has an open position establishing communication through the first and second orifice means and a closed position blocking communication through the first and second orifice means and includes a spring biasing the valve to the open position. A resolver is disposed to transmit the highest pilot pressure from the right steer pilot line and the left steer pilot line to the end of the pilot operated valve.

BRIEF DESCRIPTION OF THE DRAWINGS

The sole FIGURE is a schematic illustration of an embodiment of the present invention.

BEST MODE FOR CARRYING OUT THE INVENTION

Referring to the drawing, a jerk control valve 10 is shown in combination with a pilot operated steering system 11. The steering system includes a steering pump 12 which draws oil from a tank 13 and directs the oil to a pilot operated steering valve 14 having a right steer end 16 and a left steer end 17. The steering valve 14 is biased to the neutral position shown by a centering spring mechanism 18 illustrated in this embodiment by a spring disposed at each of the ends. A right steer operation is established by leftward movement of the steering valve to establish communication between the pump 12 and the head end of a steering cylinder 19 and the rod end of a steering cylinder 20 and between the tank 13 and the rod end of the cylinder 19 and the head end of the cylinder 20 in the usual manner. Similarly, a left steer operation is established by rightward movement of the steering valve 14 to establish communication between the pump 12 and the head end of the cylinder 20 and the rod end of the cylinder 19 and between the tank 13 and the rod end of cylinder 20 and the head end of cylinder 19. The steering pump 12 in this embodiment is a load sensing variable displacement pump whose displacement is controlled by the highest load signal through a load signal network 21. Alternatively, the steering system can include a fixed displacement pump connected to an open center steering controlling valve.

The steering system 11 also includes a pilot valve 23 connected to a source of pilot fluid such as a pilot pump 24 and to the right steer end 16 through a right steer pilot line 26 and to the left steer end 17 through a left steer pilot line 27. A pair of check valves 28, 29 are disposed within the right steer and left steer pilot lines 26, 27, respectively. Actuation of the pilot valve in this embodiment is controlled by a steering wheel 31 suitably connected to the pilot valve through a steering linkage diagramatically illustrated at 32. Rightward movement of the pilot valve directs pressurized oil through the right steer pilot line 26 and connects the left steer pilot line 27 to the tank 13. Similarly, leftward movement of the pilot valve directs pressurized pilot oil through the left steer pilot line 27 and connects the right steer pilot line 26 to the tank.

The jerk control valve 10 includes a right steer passage 34 communicating the right steer pilot line 26 downstream of the check valve 28 with the tank 13 and a left steer passage 35 communicating the left steer pilot line 27 downstream of the check valve 29 with the tank. A pair of orifice means 36, 37 are respectively disposed between the tank 13 and the right steer passage 34 and the left steer passage 35. In this embodiment, the orifice means 36, 37 are comprised of a single fixed size orifice 38, 39. Another pair of orifice means 41, 42 are respectively disposed in the right steer and left steer flow passages. The orifice means 41 includes a pair of serially disposed orifices 43, 44. Similarly, the orifice means 42 also includes a pair of serially disposed orifices 46, 47. The effective area of the orifice 38 is equal to the effective area of the orifice 39. Similarly, the effective area of the serially disposed orifices 43, 44 is equal to the effective area of the serially disposed orifices 46, 47. While the orifice means 41 and 42 each comprises a pair of serially disposed orifices, each of the orifice means 41, 42 may alternatively include a single orifice having the same effective area of the pair of serially disposed orifices.

The jerk control valve 10 also includes a pilot operated valve 48 disposed between the orifices 38, 39 and the tank 13. Alternatively, the pilot operated valve 48 can be positioned upstream of the orifices 38, 39. The pilot operated valve has an open position establishing communication through the orifices 38, 39 and a closed position blocking communication through the orifices 38, 39. A spring 49 biases the pilot operated valve 48 to the open position shown. A resolver 51 is disposed between the right steer and left steer passages 34, 35 for transmitting the higher pilot pressure from the right steer and left steer pilot lines 34, 35 to the end of the pilot operated valve 48. When the pilot operated valve 48 is in the open position, the right steer passage 34 is communicated with the tank 13 through orifices 38, 43 and 44 while the left steer passage 35 is communicated with the tank through the orifices 39, 46 and 47.

Industrial Applicability

In use, a right steer, for example, is initiated by turning the steering wheel 31 to the right for moving the pilot valve 23 rightward to the right steer position. This directs pilot pressure through the right steer pilot line 26 to the right end 16 of the steering valve 14. A small amount of oil in the right steer pilot line 26 will flow through the right steer passage 34, the orifices 43 and 44, and the orifice 38 and the open pilot operated valve 48. The pilot valve 23 however, will supply sufficient oil to build enough pressure at the end 16 for moving the steering valve 14 leftward to its right steer position. The left steer end 17 of the control valve 14 is communicated to the tank through the orifices 46 and 47 and the orifice 39 and the open valve 48. As the pilot pressure increases in the right steer pilot line 26, the resolver 51 shifts to communicate the increasing pressure to the end 52 of the pilot operated valve 48. The preload of the spring 49 is selected to maintain the pilot operated valve 48 in the open position shown for a range of pilot pressures that provides for minor to moderately high steering wheel inputs. Thus, at the start of the right steer maneuver, the total effective area of orifices 39, 46 and 47 control the "start steer jerk" and start steer response. The effective diameters of the orifices 39, 46 and 47 are sized to allow adequate start steer response and still provide a dampening effect to prevent the steering control valve 14 from overshooting. So long as the pilot pressure does not exceed the level sufficient for shifting the pilot operated valve 48 to the closed position, all of the orifices are open to tank so that the amount of dampening for start steer jerk and stop steer jerk is the same because the total effective orifice area is constant. However, for this range of steering wheel input and pilot pressure the machine is typically not in an aggressive work operation and the start steer jerk and stop steer jerk levels are typically very low.

For those machine operations which are typically aggressive in which the stop steer jerk is typically very high, the jerk control valve will provide increased dampening and reduce stop steer jerk. More specifically, when the operator turns the steering wheel 31 in the right steer direction sufficient to obtain a more aggressive steering rate the pilot pressure in the right steer pilot line 26 increases to a predetermined level sufficient to move the pilot operated valve 48 downward to its closed position blocking both orifices 38 and 39 from the tank. At this full shift position, only orifices 43 and 44 and 46, 47 are open to the tank. Blocking the orifice 39 from the tank causes increased restriction of flow from the left steer end 17 of the steering control valve thereby preventing overshoot of the steering control valve under the full shift position of the pilot valve 23.

When the operator turns the steering wheel 31 to return the pilot valve 23 from the full shift position to the neutral position in order to stop the steering motion, the right steer pilot pressure trapped at the right steer end 16 by the check valve 28 begins to slowly decay to the tank through the orifices 43 and 44 only so long as the right steer pilot pressure is above the predetermined level necessary to keep the pilot operated valve 48 in its fully shifted closed position. This dampens the steering control valve 14 as it returns to the neutral position to block pump flow to the cylinders. When the right steer pilot pressure drops below the predetermined level, the spring 49 biases the pilot operated valve 48 to its open position for communicating the orifice 38 to the tank. This permits the right steer pilot pressure to decay to the tank much more quickly. However, by that time, the machine steering rate will have decelerated to a point at which the stop steer jerk is low.

The jerk control valve 10 operates similarly when steering in the left steer direction.

In view of the above, it is readily apparent that the structure of the present invention provides an improved pilot operated steering system for providing independent control of start steer jerk and stop steer jerk. This is accomplished by the addition of the jerk control valve having a pair of orifices disposed between the right and left steer pilot lines and the tank and a pilot operated control valve having an open position establishing communication through the orifices and a closed position blocking communication through the orifices. The pilot operated control valve is moved to its blocking position when the pressure in either one of the right or left steer pilot lines exceeds a predetermined value indicative of an aggressive steering operation.

Other aspects, objects and advantages of this invention can be obtained from a study of the drawings, the disclosure and the appended claims.

We claim:

1. A jerk control valve adapted for use in a pilot operated steering system having a tank, left steer and right steer pilot lines, and a check valve disposed in each of the pilot lines, the jerk control valve comprising:

a right steer flow passage communicating the right steer pilot line with the tank;

a left steer flow passage communicating the left steer pilot line with the tank;

first orifice means disposed between the right steer flow passage and the tank;

second orifice means disposed between the left steer flow passage and the tank;

third orifice means disposed in the right steer flow passage;

fourth orifice means disposed in the left steer flow passage;

a pilot operated valve having an open position establishing communication through the first and second orifice means and a closed position blocking communication through the first and second orifice means, the pilot operated valve having a spring biasing the pilot operating valve to the open position; and a resolver disposed to transmit the highest pilot pressure from the right steer pilot line and the left steer pilot line to the end of the pilot operated valve.

2. The jerk control valve of claim 1 wherein the effective areas of the first and second orifice means are equal and the effective areas of the third and fourth orifice means are equal.

3. The jerk control valve of claim 2 wherein the third and fourth orifice means each include a pair of serially disposed orifices.

* * * * *